Figure 1:
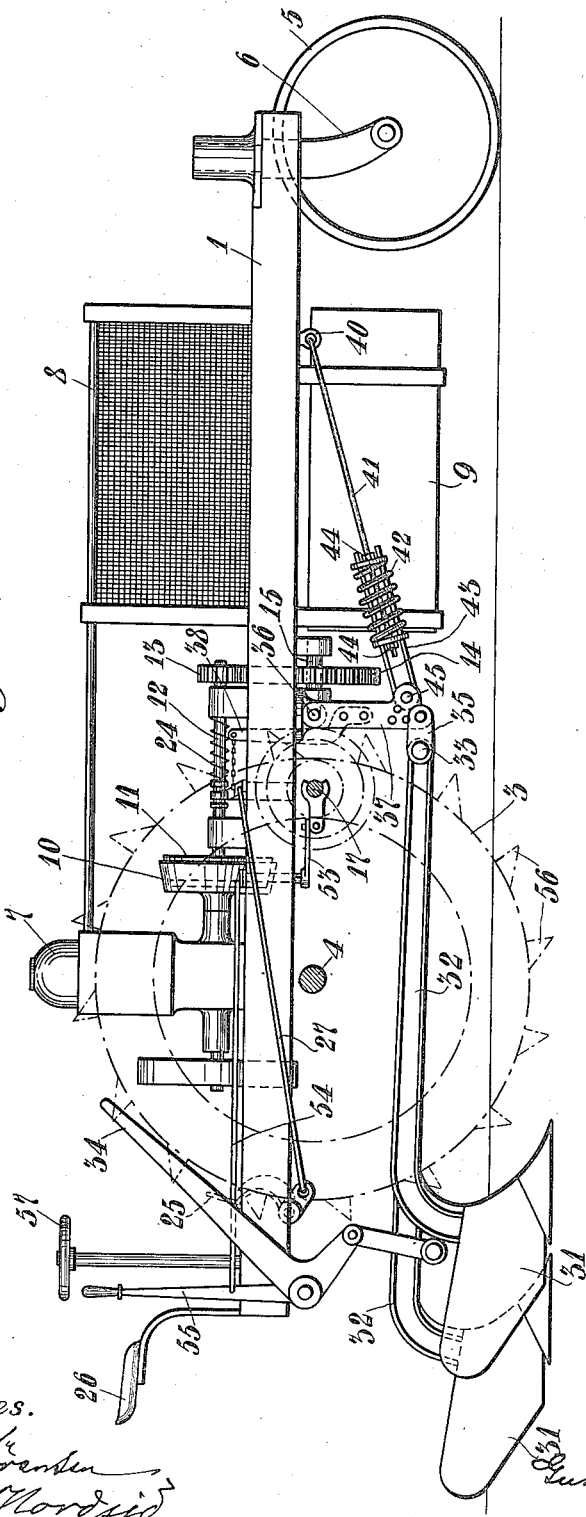
Figure 5:
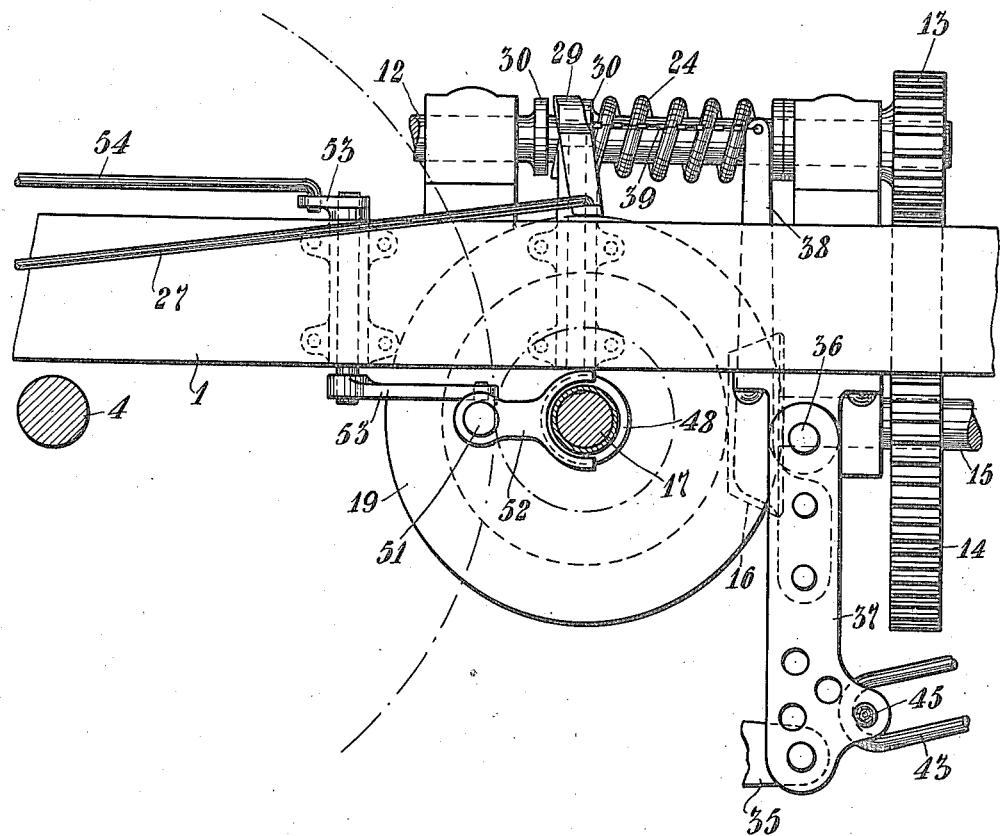

G. E. JONSSON.
MOTOR PLOW.
APPLICATION FILED DEC. 26, 1911.

1,060,095.

Patented Apr. 29, 1913.
4 SHEETS—SHEET 1.

Witnesses.

Inventor.

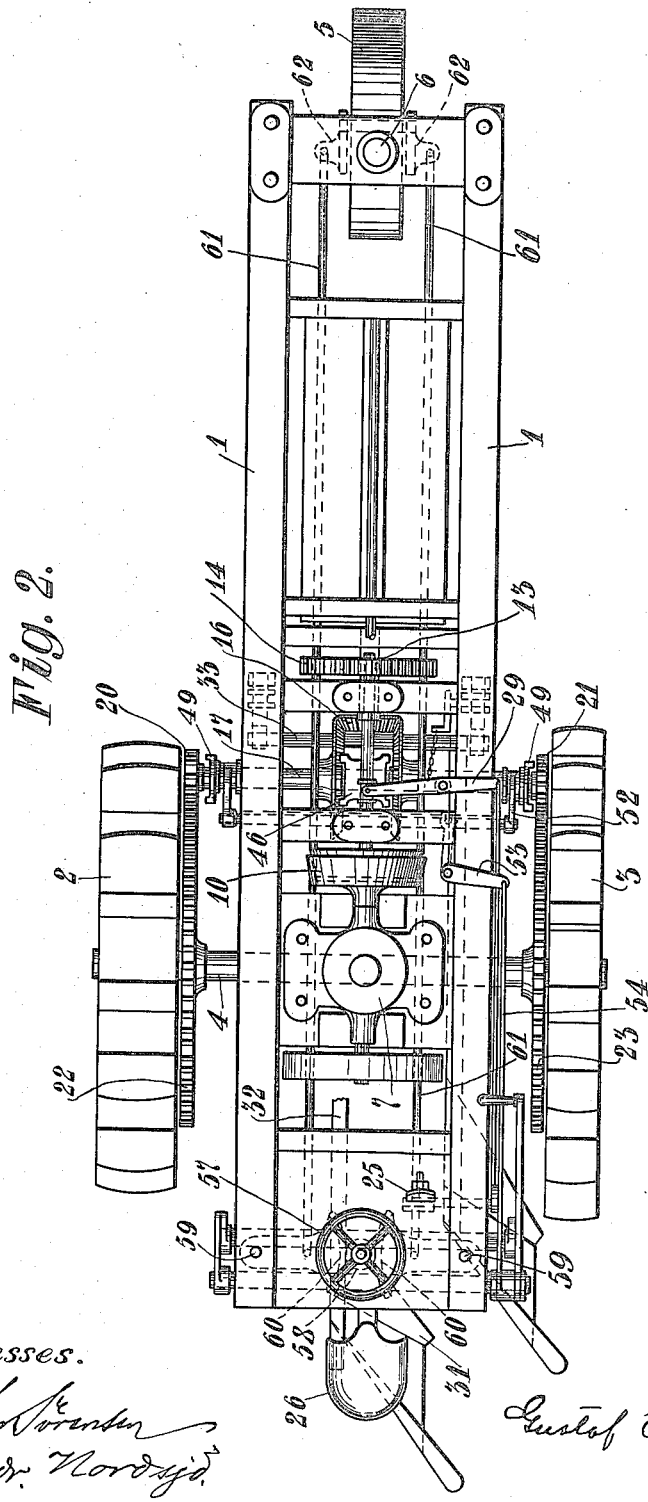

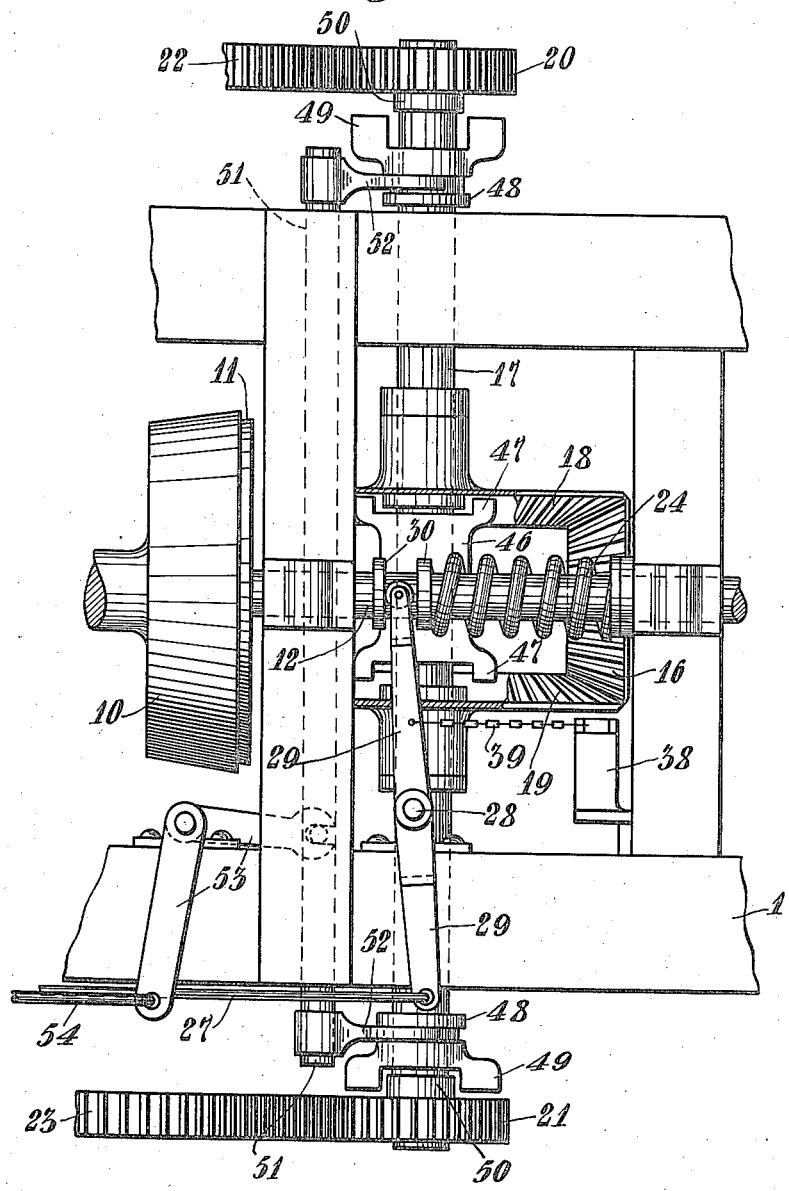

UNITED STATES PATENT OFFICE.

GUSTAF EMIL JONSSON, OF NORRKÖPING, SWEDEN, ASSIGNOR TO AKTIEBOLAGET SONS BRUK, OF STOCKHOLM, SWEDEN.

MOTOR-PLOW.

1,060,095. Specification of Letters Patent. Patented Apr. 29, 1913.

Application filed December 26, 1911. Serial No. 667,722.

*To all whom it may concern:*

Be it known that I, GUSTAF EMIL JONSSON, a subject of the King of Sweden, residing at Norrköping, in the Kingdom of Sweden, have invented new and useful Improvements in Motor-Plows, of which the following is a specification, reference being had to the drawings accompanying and forming a part hereof.

This invention relates to motor plows and particularly to plows driven by a motor placed directly on a wheeled carrier for the moldboards but also applicable to plows drawn over the field by a motor with the aid of wire-ropes or the like.

The chief object of the invention is to prevent break of the plow or of any of its parts, if any of the shares should be arrested by a large stone or by the root of a tree or the like.

Other objects of the invention will hereinafter appear.

The invention consists, chiefly, in this that the share or shares are connected to a device or devices for disconnecting the motor or motors so that the said motor or motors are disconnected and the plow is brought to a standstill if any of the shares is arrested in its forward movement. Preferably, the arrangement is such that the share or shares are connected to the carrier or frame of the plow through the intermedium of a spring or springs in such manner that the said spring or springs are extended or compressed when any of the shares is checked in its movement, so that the shares are moved relatively to the frame, said movement being transmitted to the disconnecting device so as to operate the same for disconnecting the motor.

The invention further comprises the construction and combination of parts hereinafter set forth.

In the drawings, I have shown a motor plow forming a preferred embodiment of the invention.

Figure 1 is a side view and Fig. 2 is a plan view of the plow. Figs. 3 and 4 are side view and plan view, respectively, on a larger scale, of the disconnecting device with appertaining parts.

Referring to the drawings, 1 is the frame of the plow, which is supported by two traction wheels 2 and 3 adapted to turn on a common axle or shaft 4 and a steering wheel 5 journaled in a swingable fork 6. The frame carries the internal combustion engine 7 which is advantageously placed just above the shaft 4 so that the greatest part of the weight will be supported by the traction wheels. Placed in the front part of the frame is a cooling device 8 for the cooling water of the engine, and below the said cooling device is a water reservoir 9 from which the water is pumped in usual manner through the motor.

Placed on the shaft of the engine 7 is the one part 10 of a friction clutch the other part 11 of which is attached to the longitudinally movable shaft 12 placed coaxially to the motor shaft. Attached to the shaft 12 is a pinion 13 engaging a larger cog-wheel 14 on the shaft 15. Attached to the latter shaft is, further, a bevel wheel 16 engaging two bevel wheels 18 and 19 placed loosely on the driving shaft 17. The wheels 18 and 19 are in engagement with the wheel 16, at diametrically opposite points of the same, so that they will rotate in opposite directions. Placed loosely on the shaft 17, at the ends of the same, are pinions 20 and 21 engaging larger cog-wheels 22, 23, respectively, attached to the traction wheels 2 and 3 of the plow.

Placed around the shaft 12 is a coiled spring 24 tending to keep the clutch parts 10 and 11 in engagement with each other. In order to bring the said parts out of engagement so as to disconnect the engine, when desired, a treadle 25 is provided which is within reach of the plowman seated on the seat 26. The treadle 25 is connected through a link-rod 27 to a lever 29 adapted to swing about a fulcrum 28, one end of said lever having a roller or the like working between two disks 30 attached to the shaft 12. By depressing the treadle 25 the shaft 12 with the clutch part 11 may be moved toward the right in Fig. 1 so as to disconnect the engine. Such a disconnection of the engine is automatically effected if any of the shares 31 strikes a large stone or the like so as to be checked in its movement. The shares 31, which in the embodiment shown are two in number, are attached to beams 32 pivotally attached at their front ends to a shaft 33 so that the shares may be raised and lowered by the plowman turning the lever 34. The shaft 33 is connected by links 35 to the lower ends of levers 37 adapted to swing about pivot pins 36, said levers being placed at opposite sides of the frame of the plow. Attached to one of said levers 37 (the foremost in Figs. 1 and 3) is an arm 38 the upper end of which is connected by a chain 39 or the like to the lever 29. Attached to eyes or rings 40 in th frame 1 are rods 41 connected through the medium of helical springs 42 to clamps 43 swingably attached to the lower ends of the levers 37 in such manner that the springs 42 are compressed when the rods 41 and clamps 43 are drawn apart. The tension of the springs 42 may be regulated by nuts 44 screwed on the rods 41. When the plow works, the traction is transmitted from the frame 1 through the rods 41, springs 42, clamps 43, links 35 and beams 32 to the shares 31. If one of the latter meets a stone and is thereby checked in its movement, the springs 42 are compressed, the levers 37 are swung backward (in the clockwise direction, Fig. 1) and the arm 38 pulls the clutch part 11 out of engagement with the clutch part 10 so that the engine is disconnected. In order to still more increase the safety against break of any expensive parts of the plow the pins 45 connecting the clamps 43 to the levers 37, or other connecting parts, may be made of wood or other less resistible material which breaks if the strain is too heavy or the disconnecting device should not operate in the manner designed.

Placed on the driving shaft 17 between the cog-wheels 18 and 19 is a clutch sleeve 46 which is free to move longitudinally on the shaft but is connected to the said shaft in such manner as to partake in the revolution of the same. The sleeve 46 is provided with jaws 47 adapted to be brought into engagement with corresponding jaws or the like on the wheels 18 and 19. The movement of the sleeve into engagement with one or the other of said wheels can be effected by the plowman by any suitable connection (not shown). On account of the wheels 18 and 19 rotating in opposite directions it is obvious that the plow may be caused to move forward or backward, as may be desired.

Placed on the driving shaft 17, near the ends thereof, are clutch sleeves 48 having jaws 49 adapted to be brought into engagement with corresponding jaws 50 on the hubs of the pinions 20 and 21. These clutches serve to cause either or both wheels 20, 21 to partake in the revolution of the driving shaft by which the plow may be turned on the spot in either direction while one or the other of the traction wheels 2 or 3 is at rest. The movement of the clutch sleeve 48 is effected by the sliding bar 51 which is provided with forks 52 engaging the sleeves and connected through the angle lever 53 and the link-rod 54 to the lever 55 which is within reach of the plowman.

The plow is designed to run with the one traction wheel 2 on the unworked ground and with the other traction wheel 3 in a furrow before plowed. On account thereof the wheel 3 has a somewhat greater radius than the wheel 2, as shown in Fig. 2, and the cog-wheel 23 on the former is correspondingly larger than the cog-wheel 22 on the latter so that both traction wheels will obain the same peripheral speed.

In order to prevent the traction wheels from slipping, the tires are suitably provided with wedges 56 or the like consisting in the embodiment shown of boxes having a triangular cross-section. The acting surfaces of the boxes or wedges extend at an obtuse angle to the direction of rotation of the wheels by which the advantages are gained that slipping is reliably prevented, due to the fact that the wedges press the earth downward and backward and thus obtain a firm hold, and that the wedges do not carry any earth with themselves, when they rise out of the ground. The wedges, therefore, remain clean, and the plow always moves equally light, even on moist or clayey ground.

For steering the plow a hand-wheel 57 may be used, said hand-wheel being connected to a pinion engaging two cog-sectors 60 (Fig. 2) adapted to turn about pivots 59. The cog-sectors 60 are connected by link-rods 61 to arms 62 projecting laterally from the fork 6 for the steering wheel 5.

It is obvious that the embodiment shown and described by way of example may be modified in several ways without departing from the spirit and scope of the invention. Thus, for instance, instead of two shares, one or more shares may be attached to the shaft 33, dependent on the energy developed by the engine. Instead of an internal combustion engine any other engine may be employed, for instance an electromotor, if electricity is to be had.

I claim:

1. In a motor plow, the combination of a motor, traction wheels driven by the said motor for moving the motor plow, a coupling between the motor and the traction wheels, soil-working members, and a device adapted to disconnect said coupling and to be operated from the said members if a soil-working member is arrested.

2. In a motor plow, the combination of a carrier, traction wheels for the said carrier, a driving motor, a disconnectible connection between the said motor and the traction wheels, means for disconnecting the motor from the traction wheels, soil-working members connected to the carrier, and connections between the said soil-working members and the motor-disconnecting device for disconnecting the motor and causing the plow to stop when the soil-working members are caused to move backward relatively to the carrier.

3. In a motor plow, the combination of a carrier, traction wheels for the said carrier, a driving motor, a disconnectible connection between the said motor and the traction wheels, means for disconnecting the motor from the traction wheels, soil-working members, means comprising springs for connecting said members to the carrier, and connections between the said soil-working members and the motor-disconnecting device for disconnecting the motor and causing the plow to stop when the soil-working members are caused to move backward relatively to the carrier.

4. In a motor plow, the combination of a carrier, traction wheels for the said carrier, a driving motor, a disconnectible connection between the said motor and the traction wheels, means for disconnecting the motor from the traction wheels, a rocking shaft, levers connected to the said shaft, springs connected to the said levers, soil-working members swingably connected to the said rocking shaft, and connections between the said levers and the motor-disconnecting device for disconnecting the motor and causing the plow to stop when the soil-working members move backward relatively to the carrier, against the action of the springs.

5. In a motor plow, the combination of a carrier, traction wheels for the said carrier, a driving motor, a connection between the said motor and the traction wheels comprising a reversible clutch through which motion may be transmitted to the wheels in either direction, means for disconnecting the motor from the traction wheels, soil-working members connected to the carrier, and connections between the said soil-working members and the motor-disconnecting device for disconnecting the motor and causing the plow to stop when the soil-working members are caused to move backward relatively to the carrier.

GUSTAF EMIL JONSSON.

Witnesses:
AUG. SÖRENSEN,
FREDR. NORDSJÖ.